United States Patent [19]

Stone

[11] 4,081,074
[45] Mar. 28, 1978

[54] BULK MATERIAL DISPENSING DEVICE

[76] Inventor: Paul A. Stone, 10961 Madison Rd., Huntsburg, Ohio 44046

[21] Appl. No.: 668,980

[22] Filed: Mar. 22, 1976

[51] Int. Cl.² .............................................. B65G 31/00
[52] U.S. Cl. ................................... 198/638; 198/642; 214/83.26; 214/509; 239/657
[58] Field of Search .............. 198/128, 167, 201, 202, 198/233, 318, 638, 641, 642, 835, 832; 222/178, 251, 252; 214/83.36, 508, 509, 83.26; 239/657, 661, 665, 668, 670, 672, 674, 676, 679, 684; 74/233, 234, 240

[56] References Cited

U.S. PATENT DOCUMENTS

| | | | |
|---|---|---|---|
| 2,210,505 | 8/1940 | Sinden | 198/642 |
| 2,484,689 | 10/1949 | Davis | 214/509 |
| 2,496,504 | 2/1950 | Tarrant | 239/657 |
| 2,781,892 | 2/1957 | Thevenieau | 198/128 |
| 2,812,052 | 11/1957 | Doyer | 198/128 |
| 2,855,093 | 10/1958 | Ek | 198/203 |
| 3,327,839 | 6/1967 | Sigety et al. | 198/202 |
| 3,592,393 | 7/1971 | Sinden | 198/128 |
| 3,746,264 | 7/1973 | Diener et al. | 198/128 |
| 3,763,993 | 10/1973 | Whikehart et al. | 198/203 |
| 3,923,175 | 12/1975 | Landvatter | 214/509 |

FOREIGN PATENT DOCUMENTS

| | | | |
|---|---|---|---|
| 541,288 | 7/1922 | France | 198/128 |

*Primary Examiner*—Evon C. Blunk
*Assistant Examiner*—Joseph E. Valenza
*Attorney, Agent, or Firm*—Baldwin, Egan, Walling & Fetzer

[57] ABSTRACT

An inertial bulk material dispensing device for transporting and propellantly dispensing bulk material including an endless belt movably supported along a conveyor path, an impeller wheel drivingly positioned to engage the endless belt and to drive the same at a high linear velocity along said path so that as bulk material, such as wheat, sand, salt or any other like bulk material is presented to said belt, it is rapidly transported by said belt along said path and propelled to a predisposed location.

13 Claims, 6 Drawing Figures

BULK MATERIAL DISPENSING DEVICE

This invention relates to bulk material dispensing and more particularly to a device especially designed to transport and propellantly dispense bulk material to a predisposed location. In its present form the instant device is especially designed for use with a substantially large bulk material container carried by a truck-type vehicle or the like.

BACKGROUND OF THE INVENTION

Heretofore the emptying and disposition of bulk material such as wheat, salt, corn, sand or the like from a large container such as the type carried on a truck-type vehicle which may be 20 tons or more in weight has oftentimes taken substantial periods of time.

For example, emptying large containers by gravitational methods has heretofore entailed positioning the container such that its contents are dumped into a pile and thereafter using a bulldozer or the like or mechanical shovel to move said material to the desired storage location to be thereby out of the effects of any inclement weather. Such methods of dispensing bulk materials while taking substantial periods of time have thus prevented the large bulk containers to be available for re-use until the previous load has been emptied and deposited in its storage location.

SUMMARY OF THE INVENTION

The present invention provides a new and novel bulk material dispensing device especially designed for use with a large container of bulk material to enable gravitational emptying of said material and rapidly propellantly conveying and depositing said material in a preselected location.

Another object of the present invention is to provide a bulk material dispensing device which is portable so as to be readily adapted for use with a mobile bulk material container such as a truck-type container.

Still another object of the present invention is to provide a bulk material dispensing device which includes a noval material dispensing apparatus and which incorporates a driven endless belt operable to rapidly transport said bulk material along a linear conveyance path and to propel said material therefrom and to a preselected location for storage.

Additional objects and advantages of the present invention will be apparent from the following description of one embodiment thereof, and as illustrated in the accompanying drawings wherein:

DESCRIPTION OF THE PREFERRED EMBODIMENT

Figure 1:
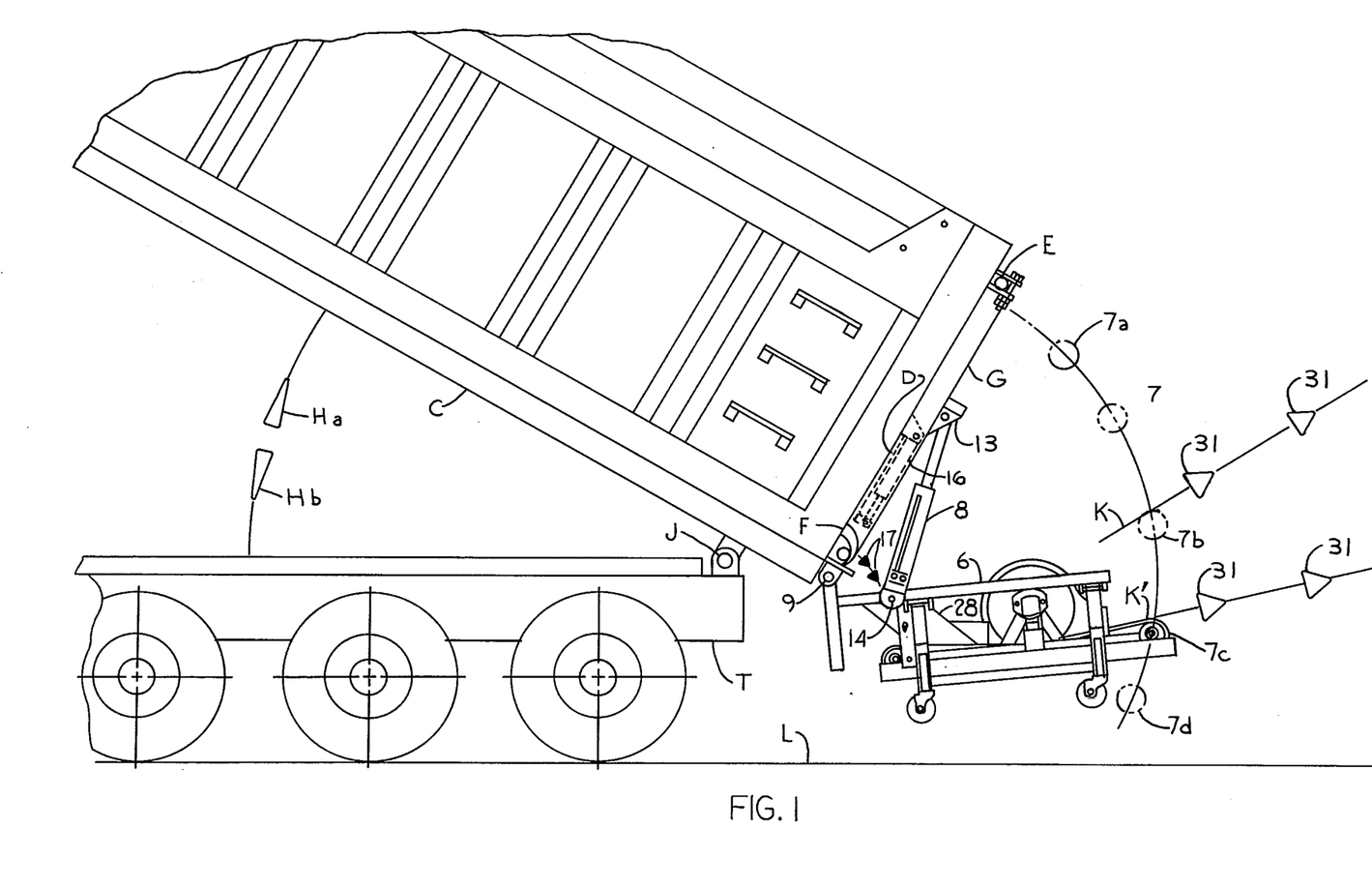
FIG. 1 is a side elevational illustration of an inertial bulk material dispensing device embodying the invention as mounted on a container of a mobile bulk material carrier.

Referring now again to the drawings, and particularly to FIG. 1, there is illustrated the preferred embodiment of the device of the present invention as identified in its entirety at 6 which is illustrated mounted on gate G of carrier container C. The bulk material carrier T in the embodiment illustrated is a highway type motor vehicle and could be, for example, a dump truck.

Generally, vehicles of this type have a swing type gate G which pivots at point E and a lock at point F which allows the bulk material in container C to be discharged by gravitational forces through a door D in said gate when container C is elevated at one end, as is indicated by arrow Ha, allowed to pivot about and at point J of carrier T; hence limiting the bulk material discharged to be at a level above plane L between points E and F.

Figure 4:
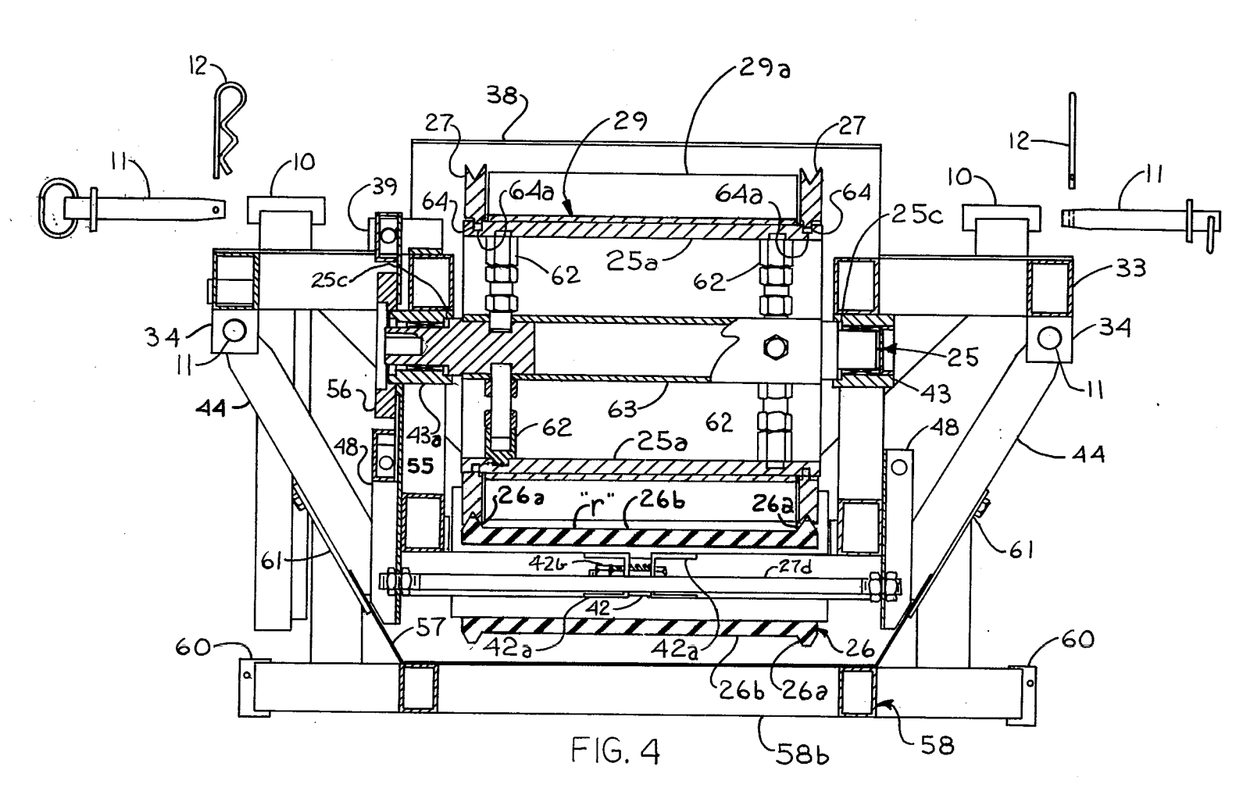
FIG. 4 is a sectional view of the device taken along the plane of line 4—4 of FIG. 3, looking in the direction of the arrows.

The device 6 in the embodiment illustrated is cantilever mounted to the lower edge of gate G at two clevis type mounts 9 and one clevis type mount 13 as shown in FIG. 1, the latter being approximately preferably left center of gate G. As shown in FIG. 4, said clevis type mounts comprise hitch type pins 11 disposed in tubular eyelets 10 and hair pin type locks 12 being snapped onto the end of each of said pins.

This mount allows for infinite adjustment of said device 6 to provide a ballistic type trajectory for the egress of material from the container as indicated by circle representations 7a through 7d of roller 7c along a locus of points equidistant from points 9, by extension or contraction of cylinder 8, the lower end of which pivots at point 14 as seen in FIG. 1. This adjustment is further augmented by elevating or lowering carrier container C, several of which positions are indicated by arrows Ha and Hb.

The door D (FIG. 5) which in this embodiment is located in lower center of gate G (FIG. 1) is mounted with two channels (not shown) carried on the outside surface of gate G, and is raised and lowered by cylinder 16 (FIG. 5) which is mounted to gate G at point A and to lower center of door at point B. This allows control of the flow of bulk material from container C (FIG. 1) into hopper 28 of device 6 indicated by arrows 17.

Figure 5:
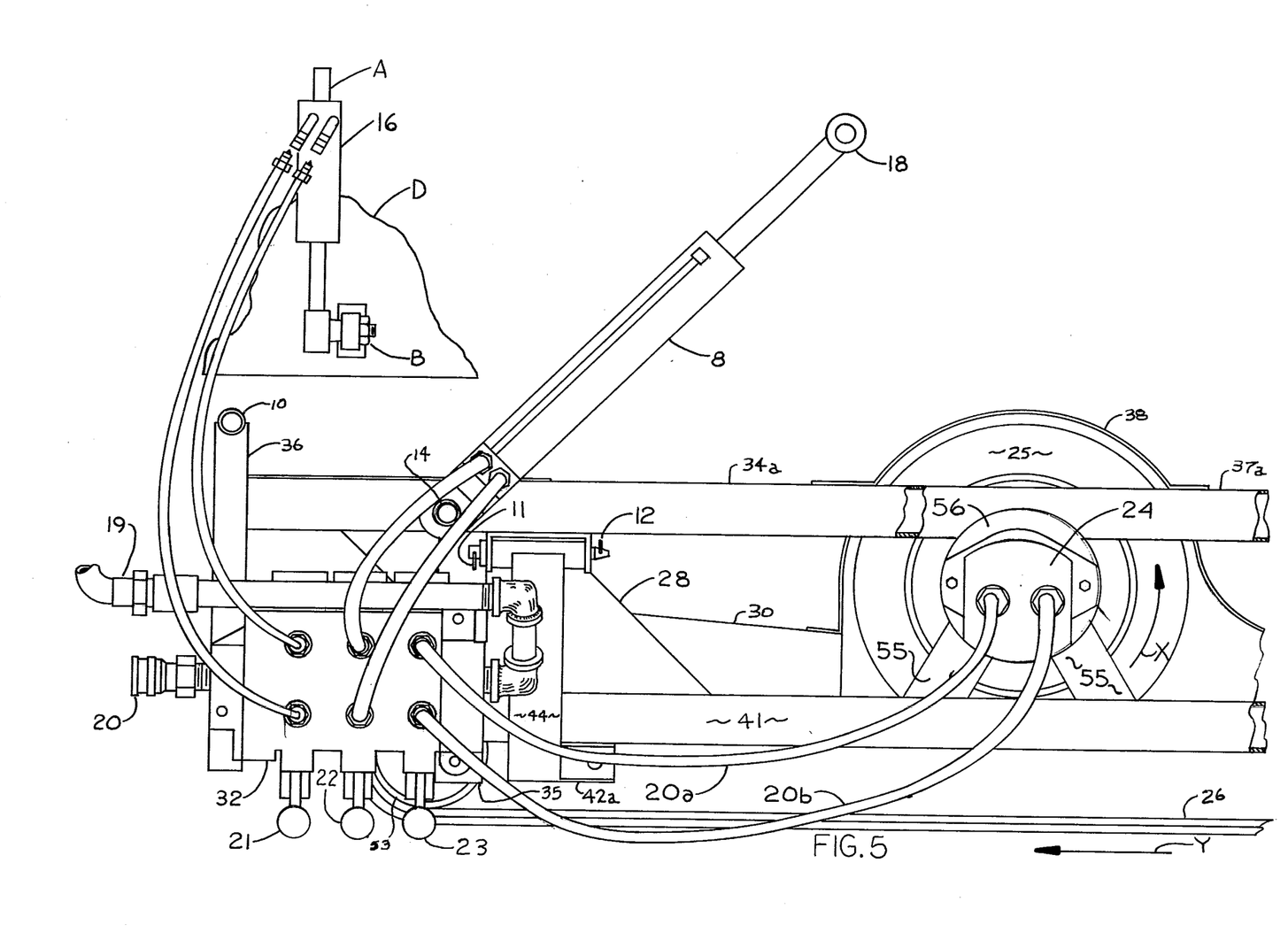
FIG. 5 is a fragmentary side elevational illustration of the device of FIG. 2, taken from the left hand side thereof, embodying in this instance, the hydraulics, but also showing a fragmentary front view of the door D in container gate G.

Generally the vehicle type in the embodiment illustrated has a high pressure hydraulic system used to elevate container C (FIG. 1). By the addition of a selector valve to this system fluid can be directed to device 6 at inlet 20 (FIG. 5). The return fluid is directed from outlet 19 to the reservoir of previously mentioned system.

Figure 2:
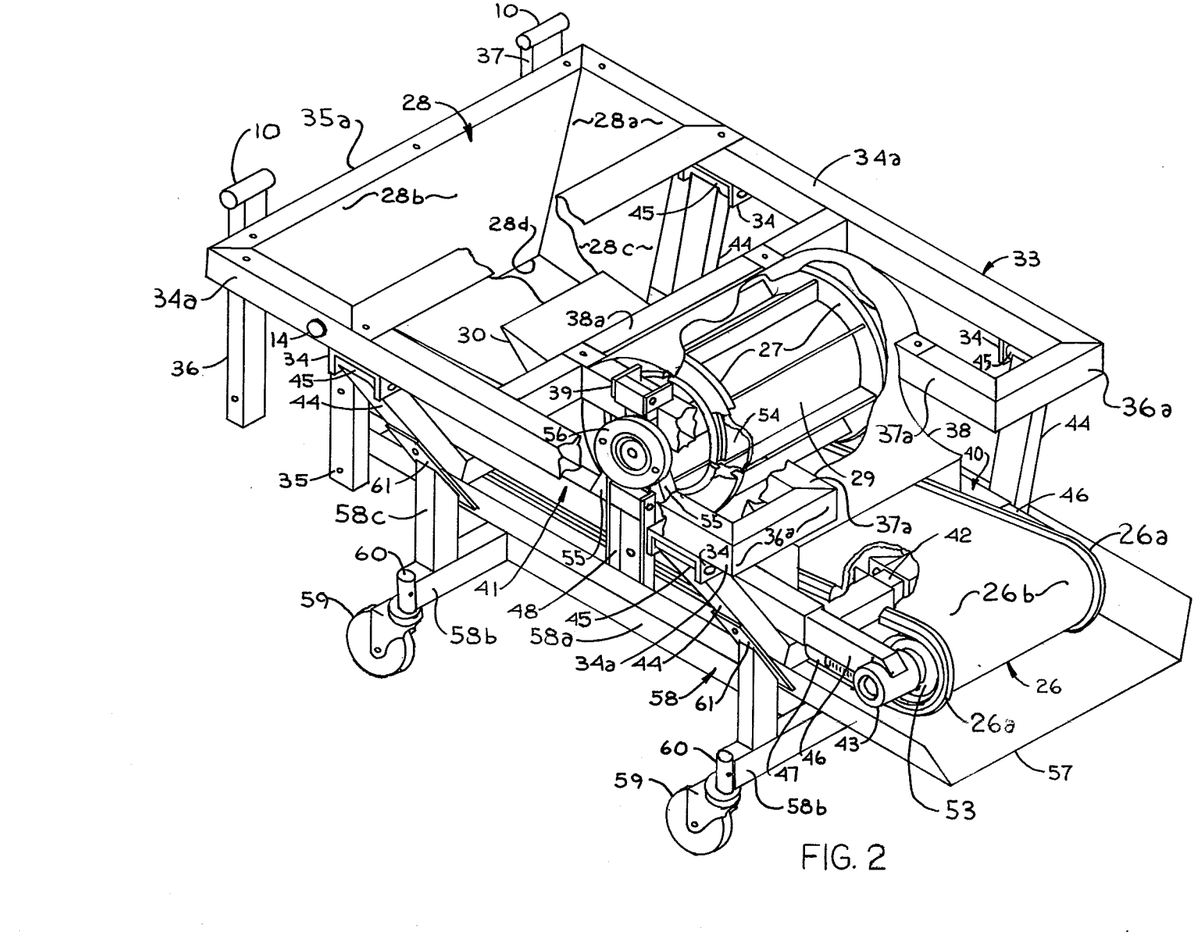
FIG. 2 is a perspective view of part of the device of FIG. 1.

Referring now to FIG. 2 which illustrates the structural framework and construction of the device, the frame in the embodiment illustrated is fabricated in this instance from rectangular steel tubing welded in place, and comprises an upper frame 33 and lower frame 33a. The upper frame 33 is generally rectangular and somewhat C-shaped as shown and includes four clevis type mounts 34 attached to the underside of the side rails 34a. Control supports or struts 35 and 36 are shown attached by welding or the like to the underside of said upper frame, strut 35 being rigidly attached to side rails 34a adjacent the left end thereof as seen in FIG. 2, whereas strut 36 is attached to the end rail 35a so as to extend downwardly therefrom. Tube support 37 and tubes 10 are also similarly attached to the end rail 35a.

The right end of the upper frame 33, as shown in FIG. 2, is provided with short end rails 36a, one end of each of which is attached at one end to its adjacent side rail 34a. The opposite end of each end rail 36a is similarly attached to one end of rail 37a, each of which are disposed inwardly of the side rails 34a and extending in parallel spaced relation therewith. The opposite end of each rail 37a is attached to a transverse rail 38a extending between side rails 34a intermediate the ends thereof.

A support 39 attached to rail 37a provides a mounting for fluid motor 24 (FIG. 5).

Figure 3:
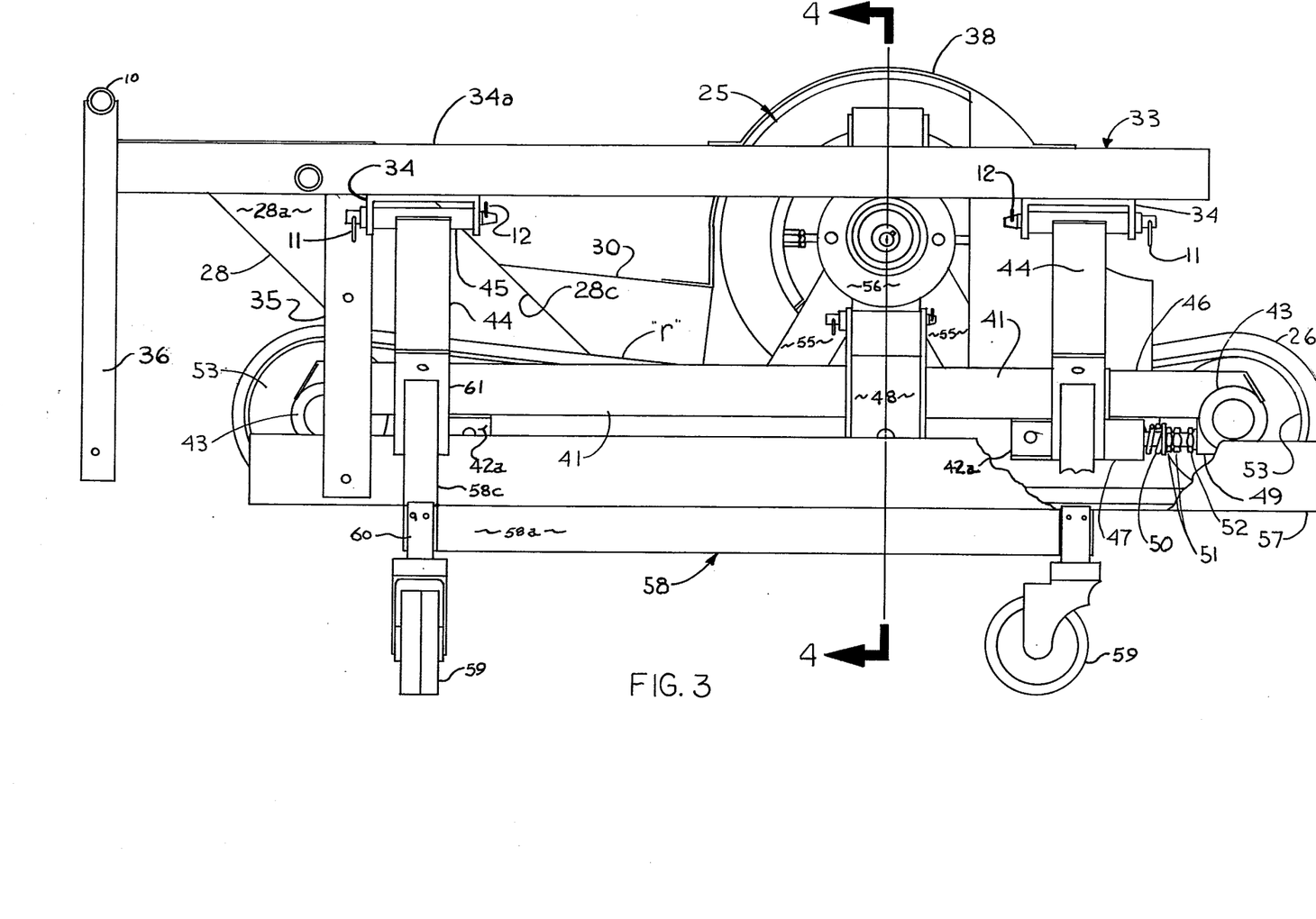
FIG. 3 is a side elevational view of the device of FIG. 2 taken from the left hand side thereof.

An input material hopper 28, as seen in FIGS. 2 and 3, is attached to the left end of the upper frame 33. Said hopper 28 is formed with downwardly and inwardly projecting side walls 28a interconnected with a back wall 28b. The front wall 28c of said hopper, as seen in FIG. 3, extends downwardly and toward the opposite end of the upper frame, said hopper being thus formed to direct bulk material downwardly and toward the right as viewed in FIG. 3. Hopper 28 is provided with discharge opening 28d, as best seen in FIG. 2, which opens directly over endless belt 26, later to be defined in greater detail.

Figure 6:
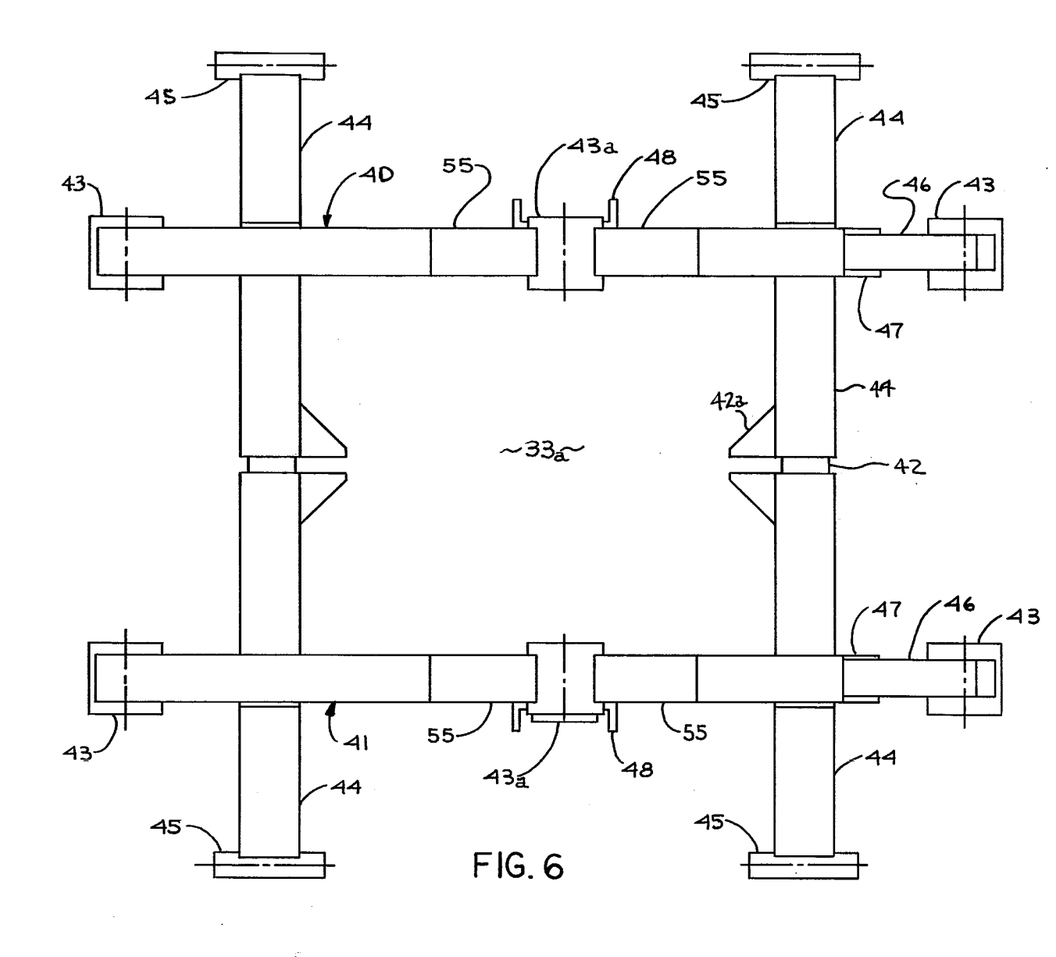
FIG. 6 is a plan view of the lower frame incorporated into the device of the present invention.

The lower frame 33a, as best seen in FIG. 6, is constructed in two sections, the right frame section 40 and the left frame section 41. These two frame sections are interconnected by suitable fasteners 42b at flanged plates 42a as seen in FIGS. 2 and 4. Both sections may likewise, as shown, be fabricated from rectangular steel tubing.

A pair of bearing supports 43 are mounted on one end of each frame section 40 and 41, as best seen in FIG. 3, and are intended to rollably mount idler rolls 43 over which endless belt 26 is extended.

A second pair of bearing supports 43 are carried on the ends of a pair of expander rails 46, one of said rails being telescopically disposed in the end of each of the side rails of the left and right lower frame sections 40, 41, at the right end thereof as viewed in FIG. 2.

A third pair of bearing supports 43a is mounted on the upper end of a pair of upright support members 55 which are attached to the upper surface of the side rail members of the left and right frame sections 41 and 40, respectively.

Support arms 44 attached at the lower end to the side rails of the frame sections 41 and 40 extend upwardly and each carries a tube 45 on the upper end.

As seen in FIG. 6, arms 44 extend toward each other within the lower frame 33a, and interfit over a rectangular tube 42. One of the arms 44 is fixed to each tube whereas its companion arm is telescopically movable thereon.

Fasteners 42b may be adjustable to slide the support arms 44 and frame section 41 relative to frame section 40 to thereby provide a pre-load adjustment as will be hereinafter referred to.

Tube 45 on each of said arms 44 interfits one of the clevis type mounting 34 on the upper frame side rails 34a and to receive hitch pins 11 and clips 12 (FIG. 4) to thereby releasably attach the lower frame 33a to the upper frame 33.

As best seen in FIG. 3, the expander rails 46 are free to move telescopically within the side rails of the lower frame sections 40 and 41 in longitudinal extension therewith. A compression spring 50 mounted over shaft 52 and interposed between stop member 49 carried on each bearing support 43 and abutment member 47 may be adjusted by rotatable nuts 51 or said shaft 52 effective to telescopically adjust the expander rails 46 longitudinally of the lower frame and vary the distance between the spaced pairs of bearing supports 43 on opposite ends of said lower frame.

An endless belt 26 of unique construction is rollably suspended between and supported on idler rolls 53 carried by the aforementioned bearing supports 43, as best seen in FIGS. 2 and 3. This belt is preferably constructed of rubberized fabric or the like and fabricated with two V-belts or V-guides 26a permanently bonded to each outside transverse edge of the belt web 26b which best can be seen in FIGS. 2 and 4.

As best seen in FIG. 3, the endless belt 26 is thus suspended between the idler rolls 53 disposed on opposite ends of the lower frame to thereby provide an upper belt run "r" which passes immediately below the hopper opening 28d, and in such position to be engaged by the underside of the impeller unit 25.

As will be understood in the art, alignment of the idler rolls 53 is accomplished by axial pre-loaded fixed bearing supports 43 by the fasteners 42b adjustably carried on flanges 42a. Said fasteners may be adjusted to pre-load the axial thrust bearings 25c. As will also be understood, adjustment rod 27d carried on strut members 48 may be adjusted to pre-load the axial thrust bearings 43a of the impeller.

By such adjustment of the axial thrust bearings 25c and 43a, the impeller is aligned to enable it to be rotated with the minimum friction.

The impeller unit 25 is cylindrical in form, consisting of a plurality of segments 25a circumferentially spaced about drive shaft 63 by expandable struts 62 (FIG. 4), said struts being adjustable radially of said drive shaft to circumferentially adjust the position of each of said segments 25a to thereby vary the effective diameter or circumference thereof.

A cleated belt 29 is disposed over the segmented impeller and has a plurality of paddles 29a integral therewith and extending transversely thereacross.

As seen in FIG. 4, the paddles 29a are of sufficient radial depth with respect to the impeller as to be spaced above the belt run "r" being thereby effective to evenly distribute the bulk material thereon as it is moved along said belt run.

The segmented impeller may be adjusted circumferentially to tighten the cleated belt 29 in place thereon so that it is carried by the impeller as the latter is rotated.

The impeller shaft 63 is supported within bearing mounts 43a carried on the upright supports 55 as best seen in FIGS. 2 and 4 to thus position the same directly over the belt run "r."

A grooved sheave 27 is attached to each side of the impeller 25, as best seen in FIG. 4, and engages the V-belts 26a as the same passes underneath, said V-belts being thus partially wrapped around said sheaves 27 and resiliently deflected or pre-loaded thereby to provide a driving relationship therebetween. The aforementioned springs 50 also provide for pre-loading said belt, as will be understood.

An O-ring 64 is disposed in a circumferential groove 64a formed in the impeller segments forming a continuous groove.

Said O-rings are disposed as to be underneath each of the drive sheaves 27 as shown in FIG. 4. As the impeller segments are adjusted circumferentially to tighten the cleated belt 29 the O-rings 64 are compressed within their grooves 64a to thereby provide a vibration damper between the drive sheaves 27 and said impeller.

Also, said O-rings 64 provide a non-slipping drive connection between the impeller and said drive sheaves 27.

As will also be understood, the driving connection between the grooved sheave 27 and its respective V-belt 26a enables a certain amount of slippage therebetween as the impeller is initially rotated, this connection thereby acting in the manner of a clutch.

The impeller 25, FIG. 5, is rotatably driven by fluid motor 24 mounted on face plate 56. As seen in FIG. 4, face plate 56 is carried on bearing support 43a by hitch pins 11 and clips 12.

As seen in FIG. 5, motor 24 is connected through flexible conduits 20a and 20b and hydraulic valve 32 to the source of fluid (conduits 19 and 20) for the vehicle type container C.

As seen in FIG. 4, the impeller segments 25a are of predetermined cross sectional thickness to provide a suitable mass to the impeller. As will be understood, the fluid motor 24 generally provides a pulsating-type torque by reason of its source of supply. In this instance with the large mass of impeller, said impeller provides an inertial flywheel effect and thus rotates substantially continuously.

A belt guard 57, as seen in FIGS. 2 and 3, is retained between stand assembly 58 and lower frame sections 40 and 41. Guard 57 is preferably fabricated from a bendable material, as in this instance, sheet metal, and is disposed so as to extend around the lower belt run of endless belt 26. An impeller guard 38 is also disposed over the impeller 25 to encompass the same, as seen in FIG. 2.

The stand assembly 58 is rectangular, being formed of a pair of steel side tubes 58a attached at the ends thereof to cross tubes 58b. An upright strut 58c is attached to each corner of the stand assembly 58 and angularly mounts a flat plate 61 on the opposite end which is affixed to the underside of strut 44 directly overhead. Casters 59 are detachably mounted on the ends of the cross tube 58b and are retained by hair pin type clips 12 (FIG. 4). The function of the casters is to allow movement of the device 6 during storage period or when not in use. When the device is mounted as illustrated in FIG. 1 the casters are detached and stored for dismount.

Now referring to FIGS. 1 and 5, the operation of device 6 will now be described. The device in this embodiment is normally at position 7a during movement of vehicle T. At desired location container C is elevated to proper position, as for example, the position indicated by arrow Ha. The device 6 is then lowered to provide the desired trajectory position for the bulk material as for example the position indicated at 7b or 7c to provide trajectory path K or K', respectively. This is accomplished by actuating cylinder 8, in this instance, as shown in FIG. 5 by pressing down on lever 22 of hydraulic conventional bank valve 32. Levers 21 and 22, as will be understood, may be spring loaded to their neutral position. The hydraulic motor 24 in this illustration is actuated by pressing down of lever 23 (FIG. 5) which is detented to remain in the on position. This allows motor to rotate in a counterclockwise direction illustrated by arrow "X." The torque is transmitted to impeller 25 then to endless belt 26 via drive sheaves 27 and belt guides 26a, whereby the endless belt rotates in a clockwise direction as indicated by arrow "Y."

The velocity of belt is controlled by the volume and pressure of the fluid supplied to motor 24. In the illustrated assembly herein the speed of motor 24 is approximately 2000 RPM which enables endless belt to travel at approximately 105 feet per second.

The door D of container C may then be opened by actuating cylinder 16 by pressing up on lever 21 (FIG. 5). The flow of bulk material from container C is controlled by the door opening. As described earlier the bulk material flows into the hopper 28 as indicated by arrows 17. The bulk material is directed by said hopper and falls onto the upper belt run "r" between the V-guides 26a. Said bulk material is then rapidly carried by the upper run "r" of said belt and propelled thereby along the selected trajectory path K. The cleats 29a on leveling belt 29 (FIG. 2) assist in the acceleration of said material as it traverses beneath impeller 25. If for any reason material moving through hopper 28 is deflected upward when striking the belt it is then deflected downward or into the impeller area by means of the overhanging hopper chute 30 (FIG. 3).

As the bulk material traverses plant K at a constant velocity as it propellantly leaves the belt 26 it continues in a straight line by inertia. This is represented by arrows 31 (FIG. 1). Said material may thereby be deposited into an enclosure, such as a storage bin, by allowing said material to enter the storage structure (not shown) through an opening, for instance near the top. This feature could be used for transportation and storage of bulk material that requires a moisture free environment, for instance grain, salt, fertilizers or other suitable materials.

Also, it will be apparent that by preselecting the trajectory level K, K', etc., it is possible to provide for any predetermined disposition of said bulk material. Also by swinging the device 6 to and fro about its connection to the vehicle T the disposition of the material may be spread or fanned out over a wide area.

Referring to FIGS. 1 and 5, after the bulk material in carrier container C has been depleted, motor 24 is caused to stop by moving lever 23 upward to neutral position. The motor in the preferred embodiment illustrated is birotational which allows for clockwise rotation. This feature enables device 6 to free material is for any reason it becomes clogged for instance by a build-up of material between impeller 25 and belt 26. Door D may then be closed and device 6 may be elevated to its folded position as is illustrated at position 7a, for movement of carrier T. Thereafter the carrier container C of vehicle T may be lowered to the vehicle bed and the vehicle is then free to move.

Another characteristic of this preferred embodiment of dispensing device 6 is that it is detachably mounted on the vehicle T and allows the carrier T to transport other materials which do not require the service of the device. For this reason the device 6 is mounted on gate G of carrier T so that it is easily dismountable therefrom.

This characteristic also allows for a single person to mount and dismount the device 6 on said carrier. To mount the device 6, and with gate G in the unlocked condition and free to pivot at point E, carrier container C is elevated as indicated by arrow Ha until a suitable height is attained which allows clevis type mounts 9 of gate G to be in the same proximity of tubes 10 of device so that casters 59 are setting on plane L. Hitch type pins 11 are then inserted through clevis type mounts 9 and device tubes 10. Cylinder 8 is pivoted upward at point 14 until eye 18 is inserted into clevis type mount 13 and the hitch pin 11 is inserted and hairpin type locks 12 are inserted into bores of exposed end of hitch pins at points 9 and 13. Carrier container C is then lowered as indicated by arrow Hb until gate G with device mounted is in the closed condition. Lock is engaged at points F. This permits container C to hold material. Dismount of device is accomplished in a similar manner.

Also by disconnecting the source of supply fluid (conduits 19, 20) the vehicle gate G may be opened and closed in the normal manner with the device 6 still mounted thereon in its elevated position (at 7a in FIG. 1) so that the vehicle container C can be used and emptied in its usual manner.

From the foregoing description and accompanying drawings, it will be seen that the invention provides an inertial bulk material dispensing device that can be attached to a carrier container for use in elevating bulk material to a height above carrier container and to a distance from the container which is accomplished by trajectory alteration and velocity of the device. The device can also be used in the reciprocal, from stationary container to carrier container.

The terms and expressions which have been used are terms of description and not of limitation and there is no intention in the use of such terms and expressions of excluding any equivalents of any of the features shown or described, or portions thereof, and it is recognized that various modifications are possible within the scope of the invention claimed.

What is claimed is:

1. An inertial bulk material dispensing device for transporting and propellantly dispensing bulk material comprising a frame having roller means at opposite ends thereof, an endless belt suspended upon and between said roller means and extending through the frame wherein the upper run of said belt defines a generally linear conveyance path, drive means for driving said endless belt comprising a cylindrical impeller mounted on said frame intermediate said roller means and disposed above the upper run of said belt, a driving belt attached to each transverse edge of said endless belt, groove means on said impeller in driving engagement with each said driving belt, motor means operatively drivingly connected to said impeller and operable to rotatably drive said impeller and effect the rapid movement of the upper run of said endless belt through said frame, and means carried on said frame for presenting bulk material to said upper run of said belt whereby said bulk material is propelled rapidly along said conveyance path to a predetermined location.

2. An inertial bulk material dispensing device as is defined in claim 1 and wherein the impeller is formed of a plurality of segments.

3. An inertial bulk material dispensing device as is defined in claim 2 and wherein the impeller segments are adjustable radially with respect to the impeller axis to vary the diameter of said impeller.

4. An inertial bulk material dispensing device as is defined in claim 1 and wherein the impeller groove means comprising a sheave mounted on each end of the impeller and which has a groove formed thereon into which one of the driving belts is received.

5. An inertial bulk material dispensing device as is defined in claim 1 and wherein the driving belt is permanently attached to each transverse edge of the endless belt.

6. An inertial bulk material dispensing device as is defined in claim 1 and wherein the frame comprising left and right frame sections.

7. An inertial bulk material dispensing device as is defined in claim 6 and wherein means adjustably connect the frame sections to each other.

8. An inertial bulk material dispensing device as is defined in claim 1 and wherein a bulk material hopper is carried on said frame adjacent said upper belt run and positioned to dispense bulk material thereon.

9. An inertial bulk material dispensing device as defined in claim 1 and wherein means on said frame are provided to releasably connect said device to a bulk material carrier.

10. An inertial bulk material dispensing device as is defined in claim 1 and wherein the frame mounts wheel means to enable said device to be readily transportable.

11. An inertial bulk material dispensing device as is defined in claim 10 and wherein the frame comprises an upper frame section and a lower frame section releasably attached to each other.

12. An inertial bulk material dispensing device as defined in claim 11 and wherein the endless belt is supported on the lower frame section.

13. An inertial bulk material dispensing device as defined in claim 11 and wherein the impeller is supported on the lower frame section.

* * * * *